United States Patent
Kiekhaefer

[15] 3,674,103
[45] July 4, 1972

[54] SNOW VEHICLE ANTI-SWAY SUSPENSION SYSTEM

[72] Inventor: Elmer Carl Kiekhaefer, 2408 Cypress Gardens Road, Winter Haven, Fla. 33880

[22] Filed: May 21, 1970

[21] Appl. No.: 39,434

[52] U.S. Cl. .................................................180/5 R, 280/25
[51] Int. Cl. .........................................................B62m 27/02
[58] Field of Search ..................................180/3-6; 267/25, 267/57, 58; 280/25

[56] References Cited

UNITED STATES PATENTS

| | | | |
|---|---|---|---|
| 3,545,560 | 11/1968 | Fox | 180/5 R |
| 2,914,126 | 11/1959 | Skullerud | 180/5 R |
| 3,548,961 | 8/1968 | Newman | 180/5 |
| 2,708,133 | 5/1955 | Sewelin | 280/104 X |
| 3,165,332 | 1/1965 | Barker | 267/25 X |
| 3,263,984 | 8/1966 | Linn | 267/58 |

*Primary Examiner*—Richard J. Johnson
*Attorney*—Andrus, Sceales, Starke & Sawall

[57] ABSTRACT

The spring mounted two front steering skis of a snowmobile are stabilized by a torsion bar having its ends universally and slidably connected to the corresponding skis and its central portion carried in bearings by the body of the vehicle. The suspension for the rear axle has end sprockets carrying the track or belt and is stabilized by employing a torsion bar at the pivotal axis for the suspension arms. The torsion bar is rigidly secured to the arms.

3 Claims, 7 Drawing Figures

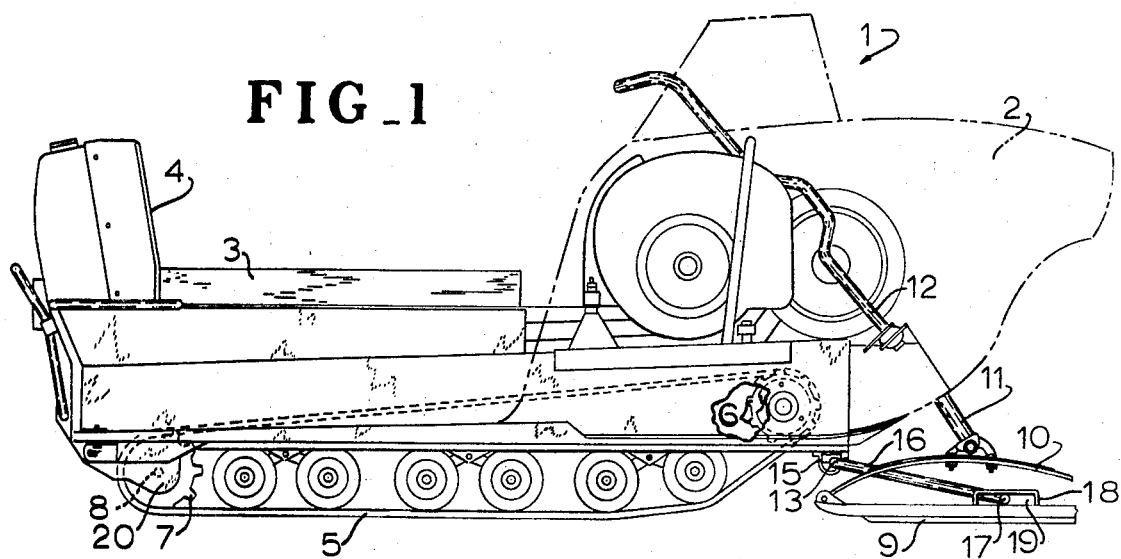
FIG_1
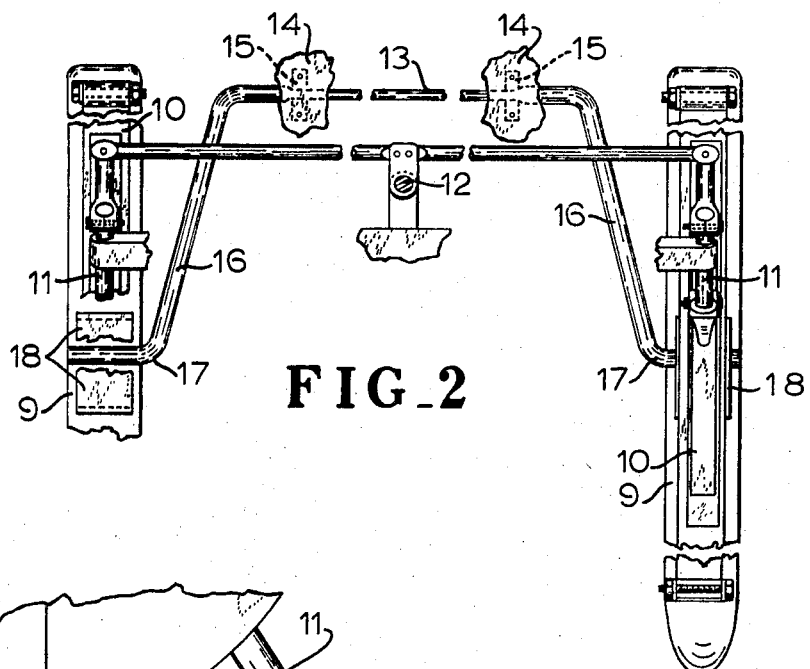
FIG_2
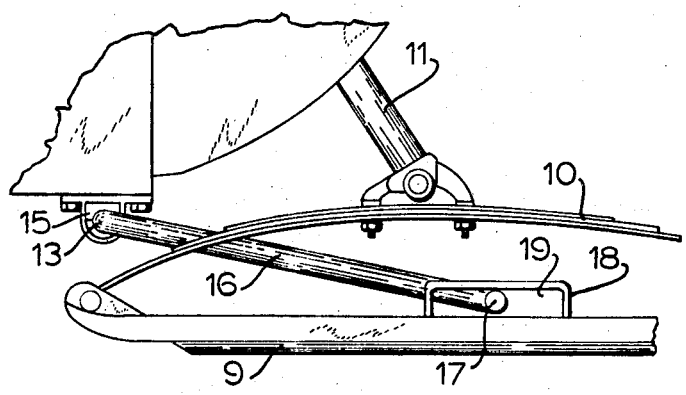
FIG_3
INVENTOR.
ELMER C. KIEKHAEFER
BY
Attorneys

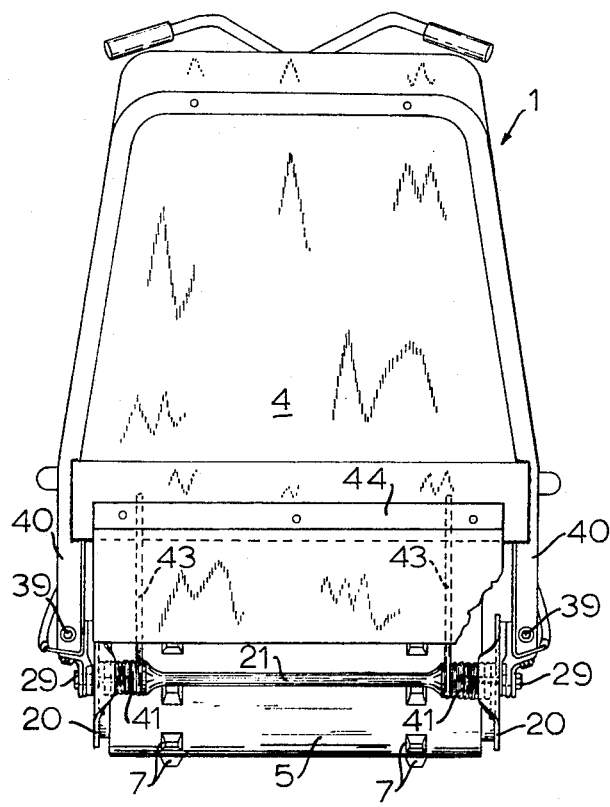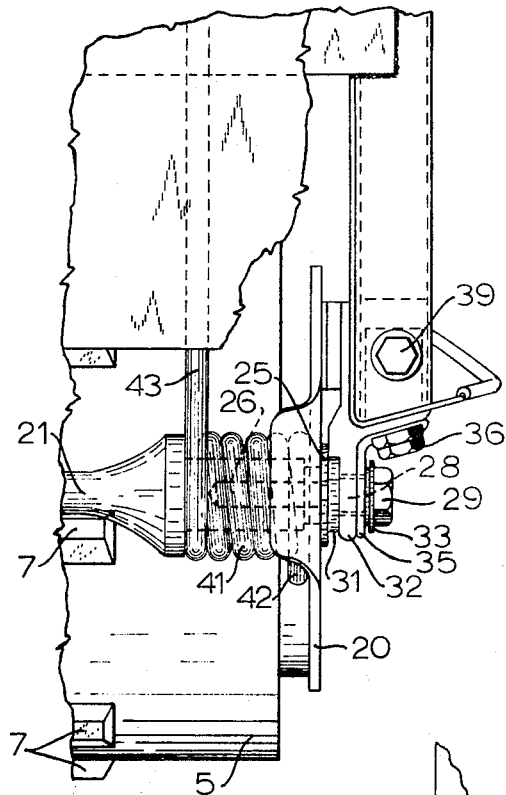

SNOW VEHICLE ANTI-SWAY SUSPENSION SYSTEM

BACKGROUND

This invention relates to the stabilizing of snowmobiles by a torsion bar suspension system.

Automobiles and other land vehicles have been stabilized by the use of torsion bars in various combinations.

However, the attempt to apply torsion bar stabilizers to snowmobiles presents several problems unlike those encountered in automobiles due to the fact that snowmobiles are generally supported upon a track which is not as wide as the vehicle, and generally employ two front skis which are flexibly mounted for steering purposes.

The stabilizing of a pair of laterally spaced flexibly mounted steering skis does not appear in the art heretofore.

SUMMARY

According to the invention the separately generally pivotally mounted unsprung front skis of a snowmobile are stabilized by a transverse torsion bar carried by the body of the vehicle and having the ends thereof formed as lever arms slidably engaged with the corresponding skis.

The rear axle for the two side sprockets carrying the rear end of the track or belt of the snowmobile is stabilized by providing a torsion bar connection between the two independent lever arms supporting the axle, the torsion bar being disposed at the fixed pivotal axis of the lever arms and being rigidly secured to the arms.

The front end construction of the invention greatly stabilizes the skis which are employed primarily for steering of the snowmobile. Both the front and rear end constructions of the invention greatly stabilize the body or spring weight of the snowmobile relative to the unsprung parts supporting the same.

DRAWING

In the accompanying drawings which illustrate a preferred embodiment of the invention:

FIG. 1 is a side elevation of the front and rear portions of a snowmobile with parts broken away to show details of support;

FIG. 2 is a detail top plan view of a portion of the front end with parts broken away;

FIG. 3 is an enlarged detail of the sliding mounting for one end of the front torsion bar on the corresponding ski.

FIG. 4 is a rear end elevation of the construction of FIG. 1;

FIG. 5 is an enlarged detail of a portion of FIG. 4;

FIG. 6 is a detail vertical section taken axially of 15 the mounting of FIG. 5; and FIG. 7 is a side elevation of the portion shown in FIG. 5.

BRIEF DESCRIPTION

The embodiment illustrated in the drawings is of a snowmobile 1 having a forward portion represented by the housing 2 containing the engine and drive mechanism, and a rearward portion represented by the seat 3 with its back 4, all mounted upon a single track 5 for supporting the same on the snow.

The track 5 consists of an endless belt mounted on a pair of aligned sprockets 6 at its forward end and which are suitably driven by the engine, not shown, and a pair of aligned sprockets 7 carried by an axle 8 at its rear end of the snowmobile.

The front end construction employs a pair of laterally spaced skis 9 carried by individual leaf springs 10 suspended from a corresponding steering rod 11. The steering rods 11 are linked to a central steering column 12 operable by the driver of the snowmobile.

For the purpose of stabilizing the skis 9, a torsion rod 13 is secured transversely of the frame 14 by suitable bearings 15.

The ends 16 of rod 13 extend forwardly and downwardly toward the corresponding skis and are bent as at 17 to rest horizontally on the top of the same.

A strap 18 secured to the top of each ski extends over the corresponding horizontal end 17 of rod 13 and provides a fore and aft slot 19 in which the end 17 may freely move.

The horizontal end 17 of rod 13 intersects the steering axis of steering rod 11. This prevents the end 17 from being withdrawn from the slot 19 upon turning the ski 9 when steering.

At the rear end of the snowmobile each end of the axle 8 for sprockets 7 is journaled in the forward end of a lever arm 20, the rear end of which is fixed to a torsion bar 21 extending therebetween transversely across the vehicle.

The torsion bar 21 has a reduced central portion of substantial length to provide torsional yielding of the bar when one lever arm 20 tends to pivot differently than the other, this yielding conversely presenting a desirable resistance to such differential pivoting of the lever arms 20 relative to each other.

The arms 20 are preferably connected to the corresponding ends of the bar 21 by having a polygonal opening in the arm fitting upon a complementary polygonal portion 22 of the bar and against a shoulder 23 of the cylindrical body 24 of the bar.

Each arm 20 is retained on bar 21 by a washer 25 held against the end of the bar and against the outer side of the arm 20 by a lag screw or bolt 26 threaded axially into the end of the bar and having a shoulder 27 engaging the outer side of the washer 25.

The bolt 26 has a generally cylindrical body 28 of substantial length between shoulder 27 and the bolt head 29.

A nylon or teflon bushing 30 encircles body 28 of bolt 26 and extends through the wear pad 31 and the frame 32 of the snowmobile. The bushing 30 is flanged at its outer end to provide a suitable bearing between frame 32 and a washer 33 beneath the bolt head 29 and thereby permit the latter to turn with arm 20 free of the snowmobile frame.

The torsion bar 21 may be adjusted forward and back to provide an adjustment for the tightness of the snowmobile belt or track 5 upon the sprockets 7.

For this purpose the frame 32 is in the form of an angle iron running longitudinally of the snowmobile and has a slot 34 receiving the bushing 30 and which permits the latter, with its bolt 26 to be positioned adjustably longitudinally with respect to the frame 32.

An angle iron bracket 35 fits within the angle iron frame 32 and has a hole complementary to and fitting bushing 30.

The bracket 35 is clamped to frame 32 at a selected position of adjustment, by a bolt 36 extending freely upwardly through a slot 37 in the upper flange of frame 32, and threaded into a clamp block 38 disposed on the upper flange of frame 32.

The block 38 is in turn adjustable longitudinally of frame 32 by means of a bolt 39 extending through the upstanding rear seat post 40 and threaded into the block. The fore and aft position of the block 38 and of bracket 35 is determined by the threading of bolt 39.

A coil spring 41 is provided encircling the body 24 at each end of torsion bar 21 for the purpose of resisting pivoting of the corresponding lever arm 20 when track 5 rides over uneven snow or upon change in loading of the snowmobile.

This is accomplished by securing the outer end 42 of the coil spring 41 to the arm 20 and by extending the inner end 43 of the coil spring tangentially into engagement with the cross member 44 constituting a part of seat back 4.

When both lever arms 20 tend to pivot the coil springs 41 resist the movement and serve to cushion the ride for the snowmobile.

When either arm 20 tends to pivot independently of the other arm as when one side only of track 5 rides over a hump, the torsion bar 21 functions to transmit the forces to the opposite arm and both springs 41 are loaded.

The torsion bar 21 tends to stabilize the snowmobile and keep seat 3 level against unevenness in the snow where one arm 20 tends to pivot upward or downwardly relative to the opposite arm 20.

The torsion bar 21 also tends to keep axle 8 level and sprockets 7 upright.

Various modes of carrying out the invention are contemplated as being within the scope of the following claims particularly pointing out and distinctly claiming the subject matter which is regarded as the invention.

I claim:

1. The combination of a snowmobile having a chassis supported upon an endless track with a pair of forward skis separately sprung to the chassis on opposite sides thereof and subject to controlled turning for steering purposes, and a torsion bar carried transversely at the forward end of the chassis and having a generally forwardly and downwardly extending arm at each end engaging a corresponding ski to effect torsional transmission of forces from one ski to the other responsive to vertical movement of one ski relative to the other.

2. The combination of claim 1 wherein the outer end of each arm of the torsion bar is turned laterally outwardly to bear against the top surface of the corresponding ski and a bracket on the top of the ski over-rides said outer end to provide a longitudinal horizontal slot in which said outer end is free to move in response to resilient or steering movement of the ski relative to the chassis.

3. The combination of claim 1 wherein the engaging ends of the torsion bar intersects the turning axis of the corresponding ski for steering.

* * * * *